US010119575B2

(12) United States Patent
Nakamura et al.

(10) Patent No.: US 10,119,575 B2
(45) Date of Patent: Nov. 6, 2018

(54) YOKE FOR CROSS SHAFT UNIVERSAL JOINT

(71) Applicant: NSK LTD., Tokyo (JP)

(72) Inventors: Takuma Nakamura, Maebashi (JP); Yoshifumi Kurokawa, Maebashi (JP)

(73) Assignee: NSK LTD., Tokyo (JP)

( * ) Notice: Subject to any disclaimer, the term of this patent is extended or adjusted under 35 U.S.C. 154(b) by 79 days.

(21) Appl. No.: 15/307,524

(22) PCT Filed: May 12, 2015

(86) PCT No.: PCT/JP2015/063696
§ 371 (c)(1),
(2) Date: Oct. 28, 2016

(87) PCT Pub. No.: WO2015/174433
PCT Pub. Date: Nov. 19, 2015

(65) Prior Publication Data
US 2017/0051792 A1  Feb. 23, 2017

(30) Foreign Application Priority Data

May 15, 2014 (JP) .................. 2014-101232
Apr. 28, 2015 (JP) .................. 2015-090904
Apr. 28, 2015 (JP) .................. 2015-090905

(51) Int. Cl.
*F16D 3/38* (2006.01)
*F16D 3/26* (2006.01)
*F16D 1/08* (2006.01)

(52) U.S. Cl.
CPC .......... *F16D 3/387* (2013.01); *F16D 1/0864* (2013.01); *F16D 3/26* (2013.01); *Y10T 403/4617* (2015.01);
(Continued)

(58) Field of Classification Search
CPC .......... F16D 1/0864; F16D 3/26; F16D 3/387; Y10T 403/535; Y10T 403/4617; Y10T 403/7033
(Continued)

(56) References Cited

U.S. PATENT DOCUMENTS 3,307,418 A    3/1967  Greene
6,428,418 B1 *  8/2002  Appelt .................. F16D 3/387
                                         464/134
(Continued)

FOREIGN PATENT DOCUMENTS

CN    101501357 A    8/2009
DE    1694505 U     3/1955
(Continued)

OTHER PUBLICATIONS

Communication dated Mar. 9, 2018, from the European Patent Office in counterpart European Application No. 15793356.5.
(Continued)

*Primary Examiner* — Greg Binda
(74) *Attorney, Agent, or Firm* — Sughrue Mion, PLLC

(57) ABSTRACT

In a yoke for a cross shaft universal joint, the forming direction of a through hole (17a) and a screw hole (18a) is inclined relative to the axes of circular holes (19a, 19a) formed in a pair of engaging arm parts (12, 12). And, by fastening a bolt (32) to thereby put first and second flange parts (14a, 15a) nearer to each other, mutually approaching forces are applied to the connecting arm parts (12, 12) in a direction inclined relative the axes of the circular holes (19a, 19a). Thus, cup bearings (29) incorporated in the circular holes (19a, 19a) are pressed against the end of a shaft part (28a) constituting a cross shaft (27), thereby enabling suppression of occurrence of shaking motion between the bearings incorporated in the circular holes and the end of the
(Continued)

shaft part of the cross shaft supported rotatably by the bearings.

5 Claims, 12 Drawing Sheets

(52) U.S. Cl.
CPC ...... *Y10T 403/535* (2015.01); *Y10T 403/7033* (2015.01)

(58) Field of Classification Search
USPC .................................................. 464/134, 135
See application file for complete search history.

(56) References Cited

U.S. PATENT DOCUMENTS

| | | | |
|---|---|---|---|
| 2010/0069163 | A1 | 3/2010 | Kakimoto et al. |
| 2014/0020487 | A1* | 1/2014 | Neidlinger, II ....... F16D 1/0864 |
| 2014/0364242 | A1 | 12/2014 | Koyama et al. |
| 2017/0058962 | A1* | 3/2017 | Nakamura ................ F16D 3/26 |

FOREIGN PATENT DOCUMENTS

| | | | |
|---|---|---|---|
| DE | 1106123 B | 5/1961 | |
| DE | 102005001082 A1 | 6/2006 | |
| EP | 2538102 A1 | 12/2012 | |
| JP | 2000320564 A | 11/2000 | |
| JP | 200328188 A | 1/2003 | |
| JP | 2007327590 A | 12/2007 | |
| JP | 20098174 A | 1/2009 | |
| JP | 2011220426 A | 11/2011 | |
| JP | 2013145008 A | 7/2013 | |
| JP | 2013160370 A | 8/2013 | |
| JP | 2013177949 A | 9/2013 | |
| SU | 1506189 A1 * | 9/1989 | .................... 403/290 |
| WO | 2013/117982 A1 | 8/2013 | |

OTHER PUBLICATIONS

International Search Report dated Aug. 4, 2015, issued by the International Searching Authority in counterpart International Application No. PCT/JP2015/063696 (PCT/ISA/210).

Communication dated Jul. 2, 2018, issued by The State Intellectual Property Office of the People's Republic of China in counterpart Chinese Application No. 201580021651.1 English translation.

* cited by examiner

YOKE FOR CROSS SHAFT UNIVERSAL JOINT

TECHNICAL FIELD

The invention relates to an improved yoke constituting, for example, a cross shaft universal joint (cardan joint) for connecting together rotation shafts constituting a vehicle steering apparatus in a torque transmittable manner.

BACKGROUND ART

A vehicle steering apparatus is structured as shown in FIG. 12. The movement of a steering wheel 1 to be operated by a driver is transmitted to an input shaft 6 of a steering gear unit 5 through a steering shaft 2, a universal joint 3, an intermediate shaft 4 and another universal joint 3. And, a pair of right and left tie rods 7, 7 are pushed and pulled by a rack and pinion mechanism built in the steering gear unit 5 to thereby apply proper steering angles to a pair of right and left steering wheels according to the operation amount of the steering wheel 1. Here, as the intermediate shaft 4, generally, there is used a shaft structured such that, as shown in FIG. 13, the one-side ends of an outer shaft 8 and an inner shaft 9 are serration engaged with each other to thereby enable torque transmission and, in a collision accident, contraction. The universal joints 3, 3 are connected to the other-side ends of the shafts 8, 9.

As the universal joints 3, 3 to be incorporated into the steering apparatus, there are used, for example, such cross shaft universal joints as disclosed in the patent document 1. Description is given of a conventional structure of one of yokes constituting such cross shaft universal joints and including a basic structure to be aimed at by the invention with reference to FIGS. 14 to 16E. A yoke 10 of the conventional structure is a so called press yoke which is formed by punching and bending sequentially a metal plate such as steel material plate using a press, and includes a base part 11 and a pair of connecting arm parts 12, 12.

The base part 11 has a partially-lacking cylindrical shape and includes a discontinuous portion (slit) 13 for enabling expansion and compression of the inside diameter of the base part 11 in one circumferential location thereof. It also includes first and second flange portions 14, 15 while they are sandwiching the discontinuous portion 13 from both sides in the circumferential direction thereof. It further includes a female serration 16 in the inner peripheral surface thereof. Also, because a metal plate is folded back, the first and second flange portions 14, 15 have a double thickness dimension of a metal plate. The first and second flange portions 14, 15 have, at the mutually matching positions thereof, a through hole 17 and a screw hole 18 while they are respectively twisted with respect to the axis of the base part 11. Also, in the free state of the yoke 10, the first and second flange portions 14, 15 are substantially parallel to each other, while the through hole 17 and screw hole 18 are arranged concentrically with each other.

The connecting arm parts 12, 12 extend in the axial direction from such two locations of the axial-direction one end edge (in FIG. 14, upper end edge) of the base part 11 as are opposed to each other in the diameter direction of the base part 11. Also, the arrangement direction (in FIGS. 14 and 15, right and left direction) of the connecting arm parts 12, 12 is circumferentially coincident (parallel to) with the arrangement direction (in FIG. 15, right and left direction) of the first and second flange portions 14, 15. And, the connecting arm parts 12, 12 include mutually concentric circular holes 19, 19 in their respective tip portions. Also, the axes of the circular holes 19, 19 and the axes of the through hole 17 and screw hole 18 are arranged parallel to each other.

As shown in FIG. 16A, the yoke 10 having the above structure is made of a flat material plate 22 which includes a base plate part 20 and a pair of tongue-like parts 21, 21. Firstly, the two ends of the base plate part 20 of this material plate 22 are respectively folded back 180° in their respective middle portions, thereby providing a first intermediate material 23 as shown in FIG. 16B. Next, the first intermediate material 23 is pressed between a pair of dies to be deformed plastically, thereby providing a second intermediate material 24 as shown in FIG. 16C. In the second intermediate material 24, the tongue-like parts 21, 21 to provide the paired connecting arm parts 12, 12 are curved in a partially cylindrical manner, the base end near portions of the tongue-like parts 21, 21 are bent substantially in a crank shape, and the intermediate portions of the tongue-like parts 21, 21 to the leading end near portions thereof are offset with respect to the base plate part 20. Next, of the thus-structured second intermediate material 24, the central portion of the base plate part 20 is slightly curved to provide a third intermediate material 25 as shown in FIG. 16D. Next, the base plate part 20 of the third intermediate material 25 is curved further to provide a fourth intermediate material 26 as shown in FIG. 16E. In this state, there are formed the base part 11 and the paired connecting arm parts 12, 12 to be equipped in the yoke 10 after completed. Finally, the through hole 17 and screw hole 18 are formed in the first, second flange portions 14, 15 constituting the base part 11, the female serration 16 is formed in the inner peripheral surface of the base part 11, and the circular holes 19, 19 are formed in the connecting arm parts 12, 12, thereby providing the yoke 10 as shown in FIGS. 14 and 15.

As shown in FIGS. 16A to 18, to assemble a cross shaft universal joint using the above-produced yoke 10, inside the circular holes 19, 19 formed in the tip portions of the connecting arm parts 12, 12, there are pivotally supported the two ends of one shaft part 28a of a pair of shaft parts 28a, 28b constituting a cross shaft 27. Thus, cup bearings 29, 29 are internally engaged with and fixed to the insides of the circular holes 19, 19.

The cup bearings 29, 29 respectively correspond to shell-type needle bearings and include bottomed cylindrical cups 30, 30 corresponding to shell-type outer rings, and include bottomed cylindrical cups 30, 30 corresponding to shell-type outer rings and multiple needles 31, 31. To assemble these cup bearings 29, 29, while the shaft part 28a of the cross shaft 27 is inserted into the circular holes 19, 19, the cups 30, 30 with the needles 31, 31 arranged along the inner peripheral surfaces thereof may be pressure inserted into the circular holes 19, 19 from the outer-surface side openings of the connecting arm parts 12, 12. Thus, the two ends of the shaft part 28a are rotatably supported on the yoke 10. Here, after completion of such assembling operation, the inner peripheral surfaces of the cups 30, 30 function as the outer ring raceways of the cup bearings 29, 29, while the outer peripheral surface of the shaft part 28a functions as the inner ring raceways of the cup bearings 29, 29.

Also, for assembling a steering apparatus, to connect and fix the base part 11 of the yoke 10 to the end of a rotation shaft constituted of any one of the steering shaft 2, intermediate shaft 4 and input shaft (see FIG. 12) in a torque transmittable manner, firstly, in the free state of the yoke 10, the end of the rotation shaft is inserted into the inside of the center hole serration hole) of the base part 11. Thus, the female serration 16 formed in the inner peripheral surface of the base part 11 is serration engaged with a male serration formed in the outer peripheral surface of the end of the rotation shaft. Next, as shown in FIGS. 17 and 18, a bolt 32 is inserted through the through hole 17 and is threadedly engaged with the screw hole 18, and is further tightened. Thus, the width of the discontinuous part 13 is elastically narrowed, thereby reducing the diameter of the base part 11 elastically. As a result, the surface pressure of the serration engaged part increases, whereby the base part 11 is connected and fixed to the end of the rotation shaft in a torque transmittable manner.

In the yoke 10 having the above structure, for reason of securing the assembling workability of the cup bearings 29, 29, the end of the shaft part 28a constituting the cross shaft 27 is inserted into the radial-direction insides of the needles 31, 31 constituting the cup bearings 29, 29 with a certain degree of clearance. Therefore, when in use, there is a possibility that the end of the shaft part 28a can shake in the diameter direction (radial direction) relative to the cup bearings 29, 29 and can generate strange sounds. Also, such shaking motion can probably become excessively large with long use.

In view of the above circumstances, for example, the patent document 2 discloses an invention in which the peripheral part of a circular hole of a connecting arm part, constituting a yoke, with a cup bearing being pressure inserted therein is plastically deformed to thereby suppress occurrence of shaking motion between the cup bearing and the shaft part of a cross shaft. Also, for example, the patent document 3 discloses an invention in which the shape of a cup constituting a cup bearing is worked (the cylindrical part thereof is deformed) to thereby suppress occurrence of shaking motion between the cup bearing and the shaft part of a cross shaft. However, in both of the inventions of the patent documents 2 and 3, for suppression of occurrence of shaking motion, exclusive working on the connecting arm part or cup is necessary. This increases the working cost of the cross shaft universal joint, thereby inevitably leading to rise of cost thereof.

Here, in the conventional structure shown in FIGS. 14 to 19, the circumferential phases of the arrangement direction of the axes of the through hole 17, screw hole 18 and the arrangement direction of the circular holes 19, 19 are coincident with each other (are arranged parallel to each other). Thus, even when the first, second flanges 14, 15 are deformed in their mutually approaching directions by tightening the bolt 32, as shown by a thick arrow in FIG. 19, the connecting arm parts 12, 12 are simply flexually deformed in the mutually approaching directions in the axial direction of the circular holes 19, 19 which is a direction parallel to the arrangement direction of the first, second flange portions 14, 15. That is, there does not occur such deformation as can reduce the above-mentioned shaking motion.

RELATED ART REFERENCE

Patent Document

Patent Document 1: JP-A-2011-220426
Patent Document 2: JP-A-2003-28188
Patent Document 3: JP-A-2007-327590

SUMMARY OF THE INVENTION

Problems to be Solved by the Invention

In view of the above circumstances, the invention aims at realizing at low costs a yoke for a cross shaft universal joint which can suppress occurrence of shaking motion between a bearing incorporated in a circular hole and the end of the shaft part of a cross shaft rotatably supported by the bearing.

Means for Solving the Problems

A yoke for a cross shaft universal joint of the invention includes: a base part for connecting and fixing the end of a rotation shaft thereto; and a pair of connecting arm parts respectively extending in the axial direction from two diametrically opposite positions corresponding to the base part at one axial end edge of the base part, wherein: the pair of connecting arm parts include a pair of circular holes formed at tip portions thereof to be concentric with each other, the pair of circular holes being configured to pivotally support the end of a shaft part, forming a cross shaft, through bearings; the base part has a partially-lacking cylindrical shape and includes a discontinuous part in one circumferential location of the base part, the one circumferential location existing between the paired connecting arm parts and being 90° out of phase with the paired connecting arm parts in the circumferential direction; the base part includes: a pair of flange parts formed across the discontinuous part; and a pair of mounting holes formed in the mutually matching portions of the pair of flange parts; and the paired mounting holes are formed such that the respective axes thereof are inclined relative to the axes of the paired circular holes, and mutually approaching forces are applied to the paired connecting arm parts in a direction inclined relative to the axes of the circular holes by putting the paired flange parts nearer to each other up to a dimension capable of fixing the end of the rotation shaft within the base part.

Here, the above bearing is not limited to a cup bearing (shell type needle bearing), but there can be employed various bearings such as a sliding bearing.

Particularly, in the cross shaft universal joint yoke of the invention, the paired mounting holes are formed such that their respective axes are inclined relative to the axes of the paired circular holes. Thus, in a state where a fastening member such as a bolt is inserted into the paired mounting holes and is fastened to thereby put the paired flange parts nearer to each other up to a dimension capable of fixing the end of the rotation shaft within the base part, the axis of the fastening member is inclined relative to the axes of the paired circular holes.

And, by putting the paired flange parts nearer to each other up to a dimension capable of fixing the end of the rotation shaft within the base part, mutually approaching forces are applied to the paired connecting arm parts in a direction inclined relative to the axes of the paired circular holes.

In enforcing the above cross shaft universal joint yoke of the invention, for example, when the yoke is viewed from the lateral surface direction, the axial direction of the axes of the paired mounting holes is inclined relative to the axial direction of the axes of the paired circular holes.

Also, in enforcing the above cross shaft universal joint yoke of the invention, for example, in view from the axial direction of the rotation shaft, the axial direction of the axes of the paired mounting holes is inclined relative to the axial direction of the axes of the paired circular holes.

Further, in enforcing the above cross shaft universal joint yoke of the invention, for example, the discontinuous part is inclined relative to the axial direction of the base part in such a manner that it crosses the axes of the paired mounting holes at right angles.

Further, in enforcing the above cross shaft universal joint yoke of the invention, for example, the mounting hole formed in one of the paired flange parts is formed as a through hole, whereas the mounting hole formed in the other flange part is formed as a screw hole.

Advantages of the Invention

According to the above structured yoke for a cross shaft universal joint of the invention, a structure capable of suppressing occurrence of shaking motion between the bearings incorporated in the circular holes and the end of the shaft part of the cross shaft supported rotatably by the bearings can be realized at low costs.

That is, in the invention, since the axes of the paired mounting holes respectively formed in the paired flange parts are inclined relative to the axes of the paired circular holes respectively formed in the paired connecting arm parts, by tightening a fastening member such as a bolt inserted through the mounting holes formed in the paired flange parts to put the flange parts nearer to each other, mutually approaching forces can be applied to the paired connecting arm parts in directions inclined relative to the axes of the paired circular holes. This can prevent formation of a radial clearance between the bearings incorporated in the circular holes and the end of the shaft part of the cross shaft inserted into the bearings, thereby enabling suppression of occurrence of shaking motion between the bearings and the end of the shaft part. Also, in the invention, since there is eliminated the need for exclusive working for suppression of such shaking motion occurrence, the working cost of the yoke for a cross shaft universal joint and thus a cross shaft universal joint including the yoke for a cross shaft universal joint of the invention can be reduced, thereby enabling cost reduction.

MODES FOR CARRYING OUT THE INVENTION

First Embodiment

Figure 1:
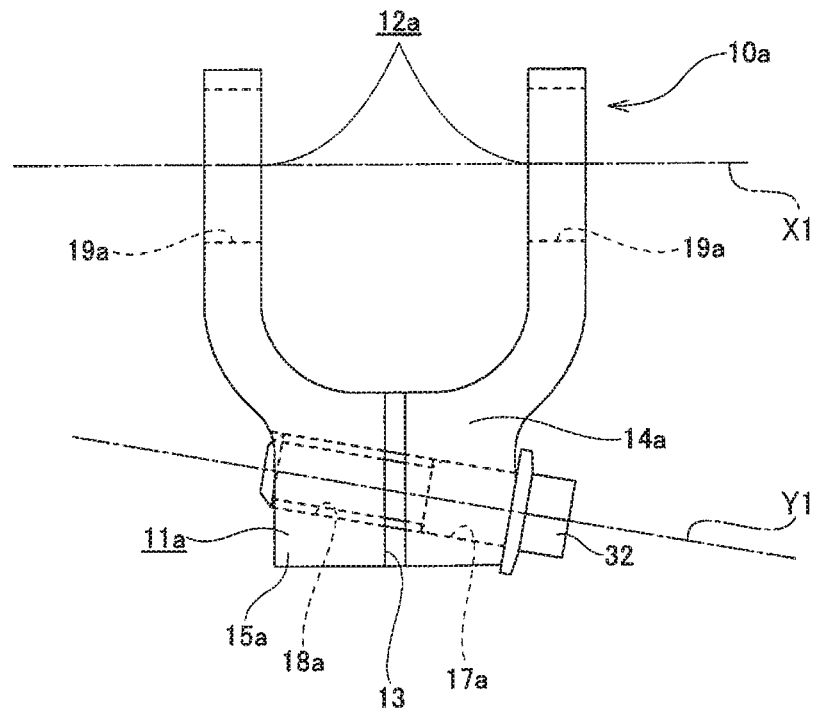
FIG. 1 is a side view of a yoke for a cross shaft universal joint according to a first embodiment of the invention.
Figure 2:
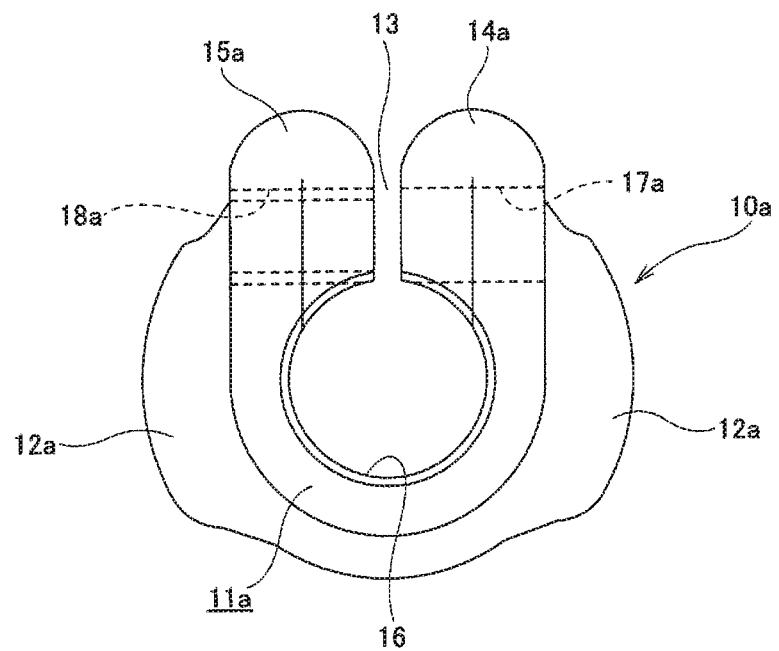
FIG. 2 is an end view of the yoke of FIG. 1 when viewed from below.
Figure 3:
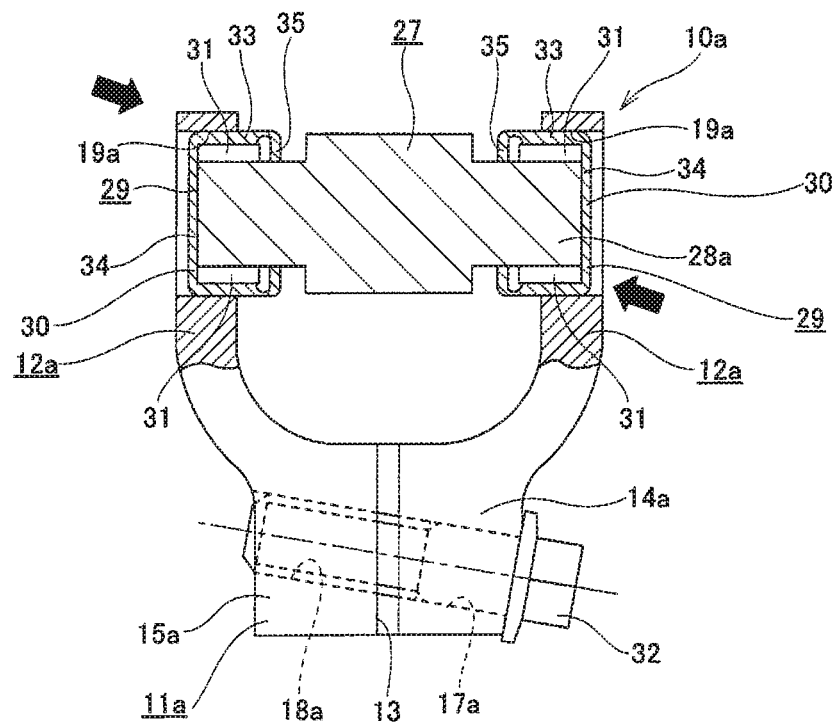
FIG. 3 is a partially cut-out side view of the yoke for a cross shaft universal joint, showing a state where the cross shaft is supported by a cup bearing incorporated in the yoke.

FIGS. 1 to 3 show a yoke for a cross shaft universal joint according to a first embodiment of the invention. Here, a yoke for a cross shaft universal unit of the invention including this embodiment is characterized in that the axes of a through hole 17a and a screw hole 18a respectively formed in first and second flange parts 14a, 15a are inclined relative to the axes of circular holes 19a, 19 respectively formed in a pair of connecting arm parts 12a, 12a. The structures and operations of the remaining parts thereof are similar to those of the above-mentioned conventional structure of FIGS. 14 to 19. Therefore, the equivalent parts are given the same designations and thus the duplicated description thereof is omitted or simplified. Thus, description is given below mainly of the characteristic parts of this embodiment.

The yoke 10a of this embodiment is a so called press yoke to be formed by enforcing punching and bending operations sequentially on a metal plate such as a steel member using a press, and includes a base part 11a and a pair of connecting arm parts 12a, 12a formed such that they are extended in the axial direction from such two locations of the axial-direction one end edge in FIGS. 1 and 3, upper end edge) of the base part 11a as are opposed to each other in the diameter direction of the base part 11a. The connecting arm parts 12a, 12a includes in the tip portions thereof a pair of circular holes 19a, 19a formed concentrically with each other and in the thickness direction of the connecting arm parts 12a, 12a.

The base part 11a has a partially lacking cylindrical shape which includes: a discontinuous part 13 penetrating in the axial direction therethrough in one circumferential location of the base part, the one circumferential location being 90° out of phase with the connecting arm parts 12, 12 in the circumferential direction; and the first and second flange parts 14a and 15a in the two locations of the base part sandwiching the discontinuous part 13a from the two circumferential sides. Since the metal plate is folded back, the first and second flange parts 14a and 15a each have a double thickness dimension of a metal plate, and the arrangement direction of the first and second flange parts 14a and 15a is coincident with the arrangement direction of the connecting arm parts 12, 12. Also, the first and second flange parts 14a and 15a include a through hole 17a and a screw hole 18a, formed concentrically with each other, in the mutually matching locations thereof.

Particularly, in this embodiment, the through hole 17a and screw hole 18a are formed in a direction inclined relative to the axes of the circular holes 19a, 19a. Specifically, the axes of the through hole 17a and screw hole 18a are inclined 5° to 45°, preferably, 10° to 20° (in the illustrated example, about 10°) in the axial direction of the base part 11a (in FIGS. 1 and 3, the vertical direction) relative to the axes of the circular holes 19a, 19a (are inclined in parallel to virtual lines respectively perpendicular to the axes of the circular holes 19a, 19a and the axis of the base part 11a and around a virtual line passing through the axes of the through hole 17a and screw hole 18a). That is, when the yoke is viewed from the side surface direction (a direction perpendicular to the sheet of FIG. 1, that is, a direction along a plane passing through the axis of the base part 11b and 90° out of phase with the paired connecting arms 12a, 12a in the circumferential direction, the axial direction Y1 of the through hole 17a and screw hole 18a is inclined relative to the axial direction X1 of the paired circular holes 19a, 19a (the axial direction Y1 of the through hole 17a and screw hole 18a and the axial direction X1 of the paired circular holes 19a, 19a are not parallel to each other).

Here, an angle (inclination angle) between the axes of the through hole 17a and screw hole 18a and the axes of the circular holes 19a, 19a can be decided properly according to the shape of the yoke 10a (particularly, the size of the rigidity of the connecting arms 12a, 12a), the size of a radial clearance between a cup bearing 29 and a shaft part 28a (to be discussed late and the like.

Figure 4:
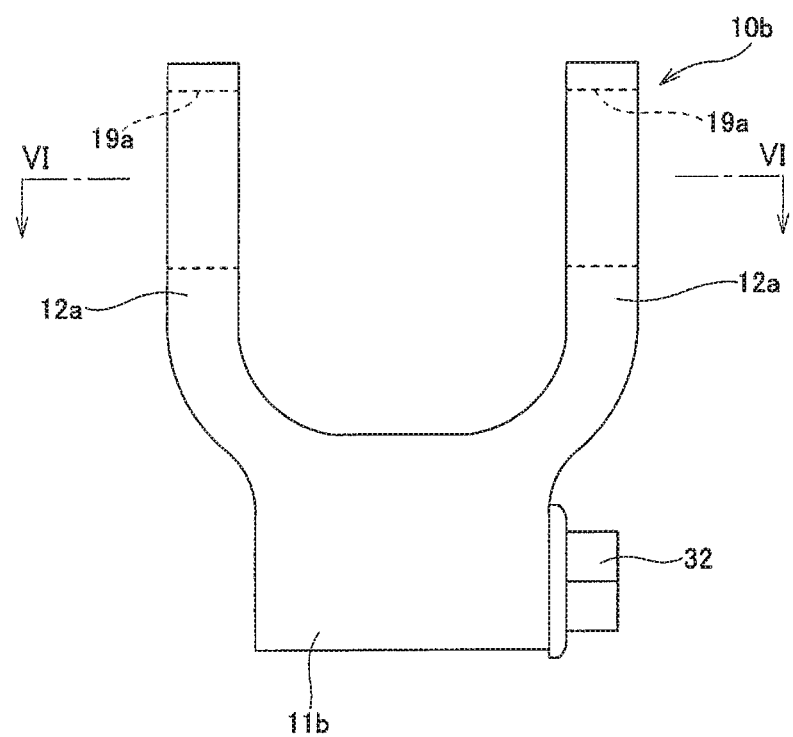
FIG. 4 is a side view of a yoke for a cross shaft universal joint according to a second embodiment of the invention.

As shown in FIGS. 3 and 4, to assemble a cross shaft universal joint using the above produced yoke 10a, the two ends of one shaft part 28a of the paired shaft parts 28a (28b) constituting the cross shaft 27 are pivotally supported on the insides of the circular holes 19a, 19a formed in the tip portions of the connecting arm parts 12a, 12a.

The cup bearings 29, 29 respectively correspond to shell type needle bearings, and include bottomed cylindrical cups 30, 30 corresponding to shell type outer rings and multiple needles 31, 31. The cup 30 is formed by bending a hard metal plate such as a carbon steel plate or a case hardened steel plate using plastic working such as deep drawing, and includes a cylindrical part 33, a bottom part 34 and an inward flange part 35. The bottom part 34 covers the whole of the axial-direction one end side (in a state where the cup bearing is assembled into the circular hole 19a, the outer surface side of the connecting arm part 12) of the cylindrical part 33. Also, the inward flange part 35 is arranged to be folded radially inward from the axial-direction other end side (in a state where the cup bearing is assembled into the circular hole 19a, the inner surface side of the connecting arm part 12a) of the cylindrical part 33. And, the above-structured cups 30, 30 are pressure inserted into the circular holes 19a, 19a and, of the outer surfaces of the connecting arm parts 12a, 12a, the opening edges of the circular holes 19a, 19a are plastically deformed radially inward to form caulking parts (not shown), thereby preventing the cups 30, 30 from moving outwardly of the circular holes 19a, 19a. Also, the two ends of the shaft part 28a constituting the cross shaft 27 are respectively inserted into the radial insides of the needles 31, 31. Thus, the two ends of the shaft part 28a are rotatably supported on the yoke 10a. Here, in the yoke 10a of this embodiment as well, the ends of the shaft part 28a can be inserted into the radial insides of the needles 31, 31 while having a certain degree of clearance in a stage where the two ends of the shaft part 28a are inserted into the radial insides of the needles 31, 31 (in a state before the bolt 32 is fastened), similarly to the conventional structure. This prevents the assembling workability of the cup bearing 29, 29 from being lowered.

Also, to connect and fix the base part 11a of the yoke 10 of this embodiment to the end of the rotation shaft in a torque transmittable manner, the end of the rotation shaft is inserted into the inside of the center hole (serration hole) of the base part 11a in the free state of the yoke 10a. Thus, the female serration 16a formed in the inner peripheral surface of the base part 11a and a male serration formed in the outer peripheral surface of the end of the rotation shaft are serration engaged with each other. Next, as shown in FIG. 3, a bolt (a circular washer equipped bolt) 32 is inserted through the through hole 17a and is threadedly engaged with the screw hole 18a, and is fastened further. Thus, since the width of the discontinuous part 13a is elastically narrowed (the first and second flange parts 14a and 15a are put nearer to each other), the base part 11a is elastically reduced in diameter. As a result, the surface pressure of the serration engaged part increases, whereby the base part 11a is connected and fixed to the end of the rotation shaft in a torque transmittable manner. In this embodiment, since the axes of the through hole 17a and screw hole 18a are inclined relative to the axes of the circular holes 19a, 19a, in a state where the bolt 32 is fastened, the axis of the bolt 32 is inclined relative to the axes of the circular holes 19a, 19a.

According to the above-structured yoke 10a for a universal joint of this embodiment, a structure capable of suppressing occurrence of shaking motion between the cup bearings 29, 29 assembled into the circular holes 19a, 19a and the end of the shaft part 28a of the cross shaft 27 rotatably supported by the cup bearings 29, 29 can be realized at low costs.

That is, in this embodiment, the axes of the through hole 17a and screw hole 18a respectively formed in the first and second flange parts 14a and 15a are inclined relative to the axes of the circular holes 19a and 19a formed in the connecting arm parts 12a and 12a. Therefore, by fastening the bolt 32 to put the first, second flange parts 14a, 15a nearer to each other, mutually approaching forces can be applied to the connecting arm parts 12a, 12 in directions inclined in the axial direction of the base part 11a relative to the axes of the circular holes 19a, 19a, as shown by thick arrows in FIG. 3. More specifically, the radial inner surface of the needle 31 situated on the upper side of FIG. 3, of the needles 31, 31 constituting the cup bearing 29 arranged on the left side of FIG. 3, is pressed down from above against the outer peripheral surface of the left end in FIG. 3 of the ends of the shaft part 28a. Further, the radial inner surface of the needle 31 situated on the lower side of FIG. 3, of the needles 31, 31 constituting the cup bearing 29 arranged on the right side of FIG. 3, is pressed upward from below against the outer peripheral surface of the right end in FIG. 3 of the two ends of the shaft part 28a. This can prevent formation of a radial clearance between the cup bearings 29, 29 incorporated in the circular holes 19a, 19a and the two ends of the shaft part 28a constituting the cross shaft 27 inserted into the insides of the cup bearings 29, 29, thereby enabling suppression of occurrence of shaking motion between the cup bearings 29, 29 and the two ends of the shaft part 28a. Also, in this embodiment, the structure providing such effects can be realized simply by changing the forming direction of the through hole 17a and screw hole 18a, while eliminating the need for exclusive working for suppressing the shaking motion as in the inventions disclosed in the above-cited patent documents 2 and 3. Therefore, the working cost of the yoke 10a, of this embodiment and thus the cross shaft universal joint incorporating the yoke 10a therein can be restricted, thereby enabling cost reduction.

Second Embodiment

Figure 5:
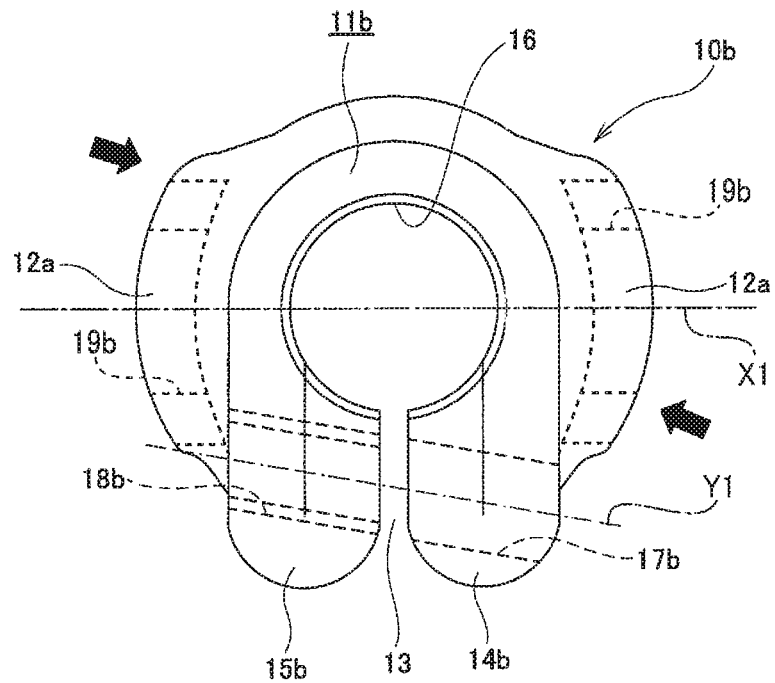
FIG. 5 is an end view of the yoke of FIG. 4 when viewed from below.
Figure 6:
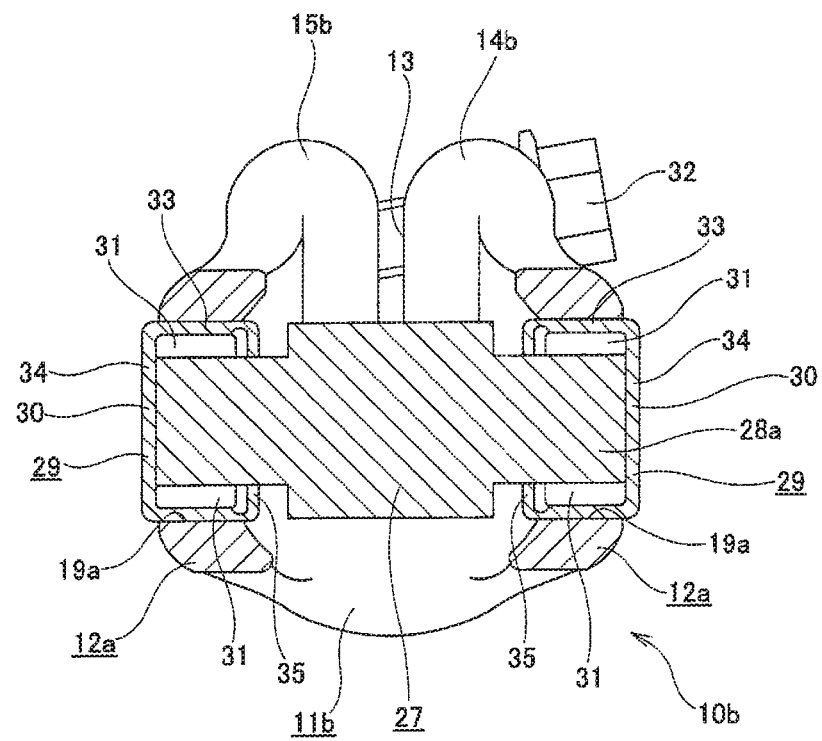
FIG. 6 is a section view taken along the VI-VI line of FIG. 4, showing a state where the cross shaft is supported by a cup bearing incorporated in the yoke.

FIGS. 4 to 6 show a yoke for a cross shaft universal joint according to a second embodiment of the invention. In the yoke 10b of this embodiment, as shown in FIG. 5, when viewed from the axial direction (the axial direction of the base part 11b), the axial direction Y1 of the axes of the through hole 17b and screw hole 18b is inclined relative to the axial direction X1 of the axes of a pair of circular holes 19, 19. That is, the axes of the through hole 17b and screw hole 18b respectively formed in the first and second flange parts 14b and 15b of the base part 11b are inclined toward the forming direction of the discontinuous part 13 of the base part 11b (the radial direction of the base part 11b) relative to the axes of the circular holes 19a and 19a respectively formed in a pair of connecting arm parts 12a and 12a (are inclined around a virtual line parallel to the axis of the base part 11b and passing through the axes of the through hole 17b and screw hole 18b. Here, in this embodiment, the axial direction X1 of the axes of a pair of circular holes 19 and 19 is coincident with the circumferential intermediate positions of the paired connecting arm parts 12a and 12a.

Thus, when the bolt 32 is inserted through the through hole 17b, is threadedly engaged with the screw hole 18b and is further tightened to thereby put the first, second flange parts 14b, 15b nearer to each other, such mutually approaching forces as shown by thick arrows in FIG. 5 can be applied to the axes of the circular holes 19a, 19a in a direction inclined toward the formation direction of the discontinuous part 13.

The structures and operations of the remaining parts are similar to those of the first embodiment.

Third Embodiment

Figure 7:
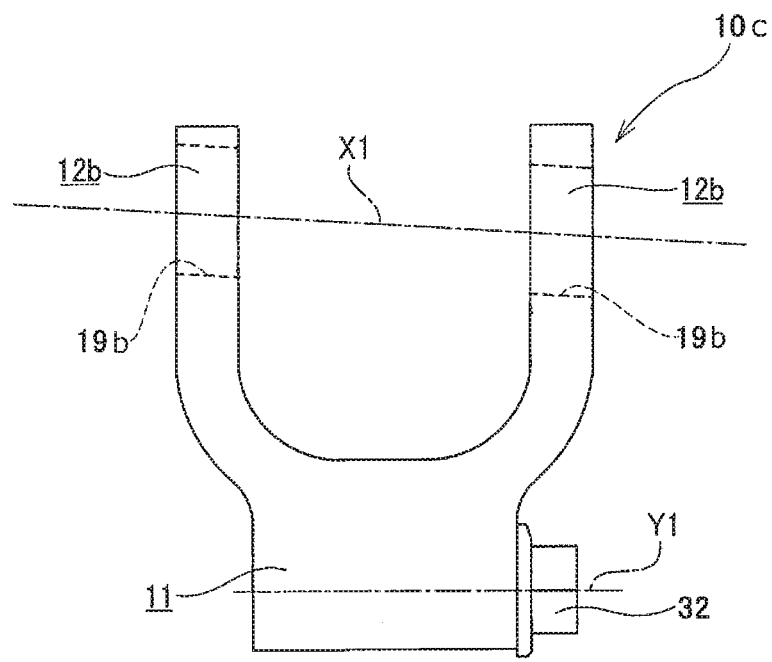
FIG. 7 is a side view of a yoke for a cross shaft universal joint according to a third embodiment of the invention.
Figure 8:
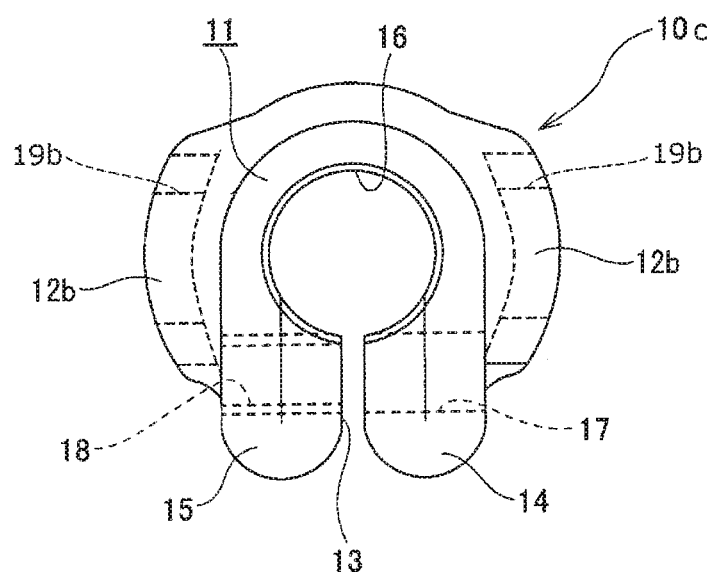
FIG. 8 is an end view of the yoke of FIG. 7 when viewed from below.

FIGS. 7 and 8 show a yoke for a cross shaft universal joint according to a third embodiment of the invention. In the yoke 10c of this embodiment, the axial direction Y1 of the axes of a through hole 17 and a screw hole 18 respectively formed in the first and second flange parts 14 and 15 is formed to extend along the arrangement direction of the first and second flange parts 14 and 15 (the expansion direction of the discontinuous part 13). Meanwhile, the axial direction X1 of the axes of the circular holes 19b and 19b respectively formed in a pair of connecting arm parts 12b and 12b is inclined relative to the arrangement direction of the paired connecting arm parts 12b and 12b in the axial direction of the base part 11. Thus, the circular holes 19b and 19b are formed such that the axes thereof are inclined toward the axial direction of the base part 11 relative to the axes of the through hole 17 and screw hole 18.

With the universal joint yoke 10c of this embodiment as well, the bolt 32 is inserted through the through hole 17, is threadedly engaged with the screw hole 18 and is further fastened to put the first and second flange parts 14 and 15 nearer to each other, thereby enabling prevention of formation of a radial clearance between the cup bearings 29, 29 incorporated inside the circular holes 19b, 19b and the two ends of a shaft part 28a constituting a cross shaft 27 inserted inside the cup bearings 29, 29 and thus enabling suppression of occurrence of shaking motion between the cup bearings 29, 29 and the two ends of the shaft part 28a.

Fourth Embodiment

Figure 9:
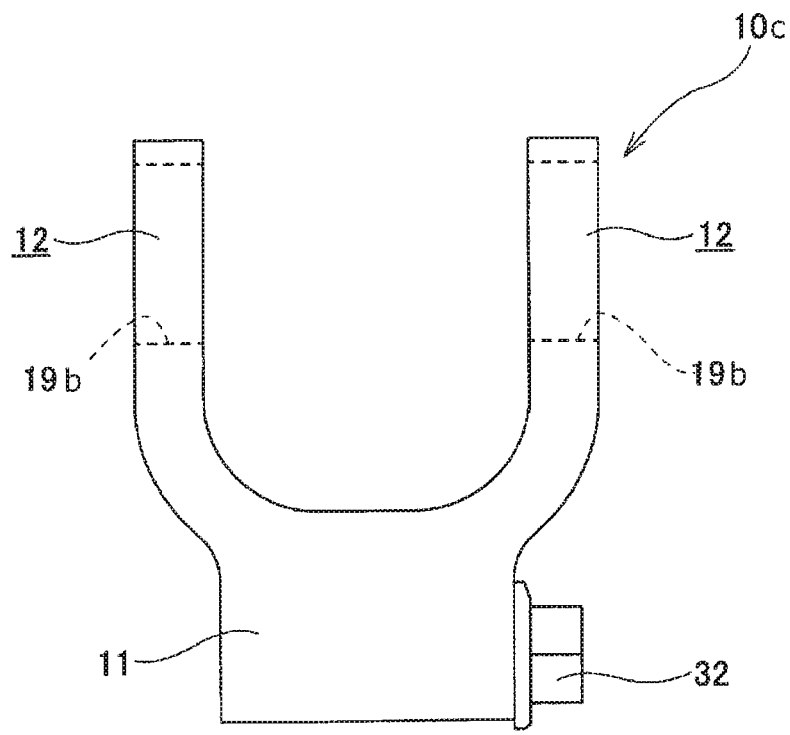
FIG. 9 is a side view of a yoke for a cross shaft universal joint according to a fourth embodiment of the invention.
Figure 10:
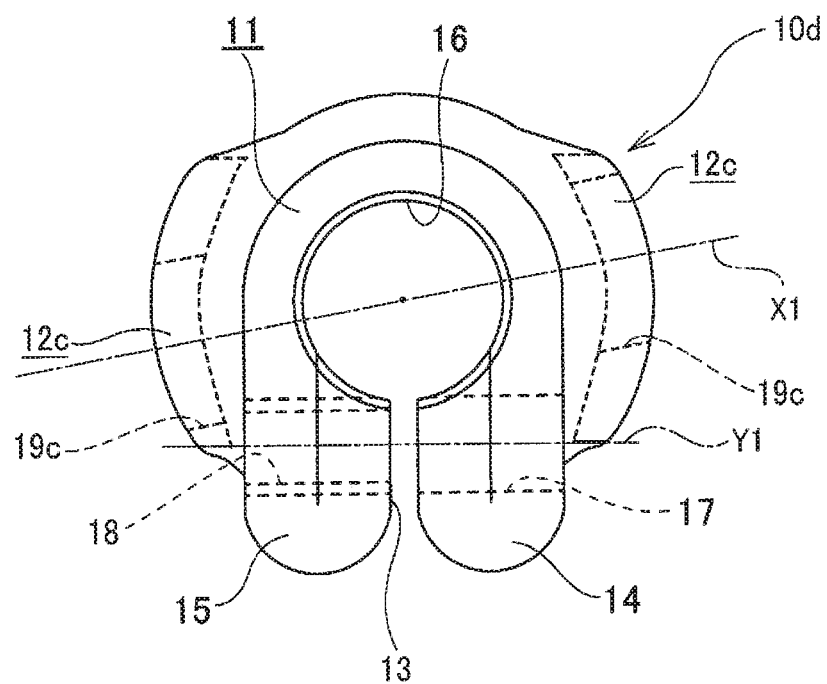
FIG. 10 is an end view of the yoke of FIG. 9 when viewed from below.

FIGS. 9 and 10 show a yoke for a cross shaft universal joint according to a fourth embodiment of the invention. With the yoke 10d of this embodiment as well, the axes of the through hole 17 and screw hole 18 respectively formed in the first and second flange parts 14 and 15 are formed to extend along the arrangement direction of the first and second flange parts 14 and 15 (the expansion direction of the discontinuous part 13).

Meanwhile, in this embodiment, when viewed from the axial direction of the rotation shaft, the axial direction X1 of the axes of the through hole 17b and screw hole 18b is formed in a direction inclined relative to the axial direction Y1 of the axes of the circular holes 19c and 19c. Specifically, in this embodiment, the above position relation is given by shifting the axes X1 of the circular holes 19c and 19c in view from the axial direction of the rotation shaft to the circumferential direction from the circumferential intermediate positions of the paired connecting arm parts 12c and 12c.

With the universal joint yoke 10d of this embodiment as well, the bolt 32 is inserted through the through hole 17, is threadedly engaged with the screw hole 18 and is further fastened to put the first and second flange parts 14 and 15 nearer to each other, thereby enabling prevention of occurrence of shaking motion between the cup bearings 29, 29 incorporated inside the circular holes 19c, 19c and the ends of the shaft part 28a of the cross shaft 27 rotatably supported by the cup bearings 29 and 29.

Here, the invention is not limited to the above embodiments but can be changed or improved properly.

Figure 11:
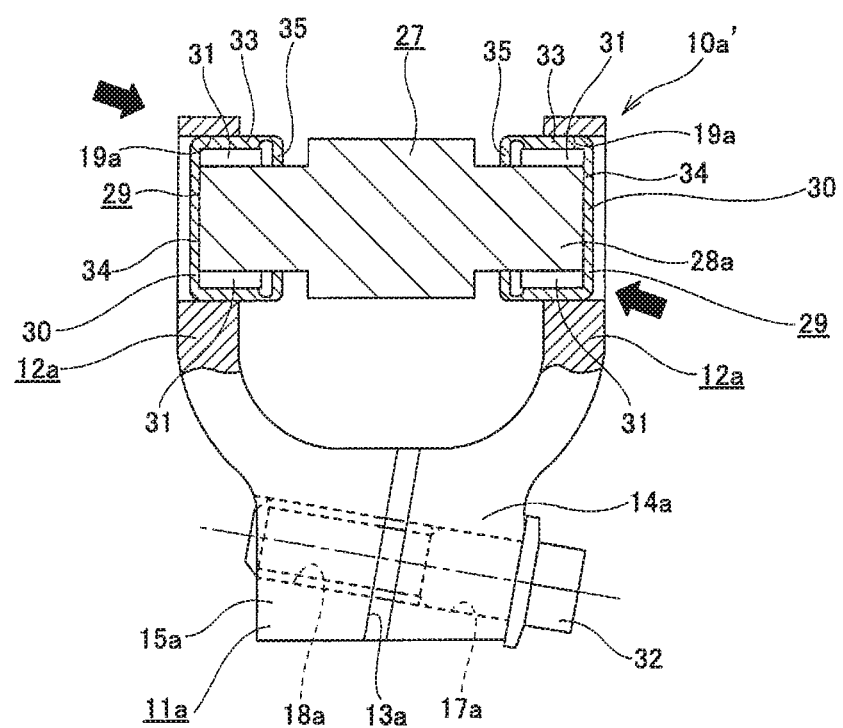
FIG. 11 is a partially cut side view of a yoke according to a modification of the invention.
Figure 12:
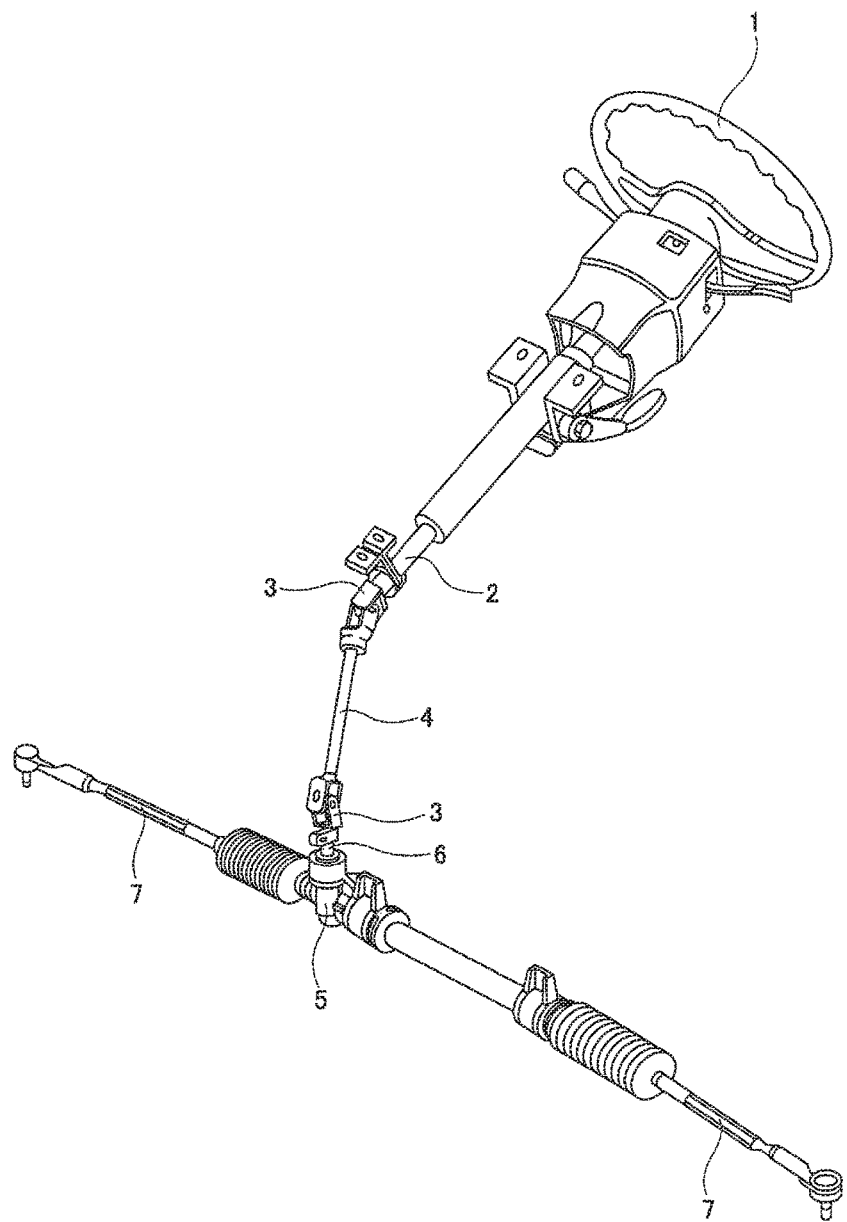
FIG. 12 is a perspective view of an example of a steering apparatus with a universal joint incorporated therein.
Figure 13:
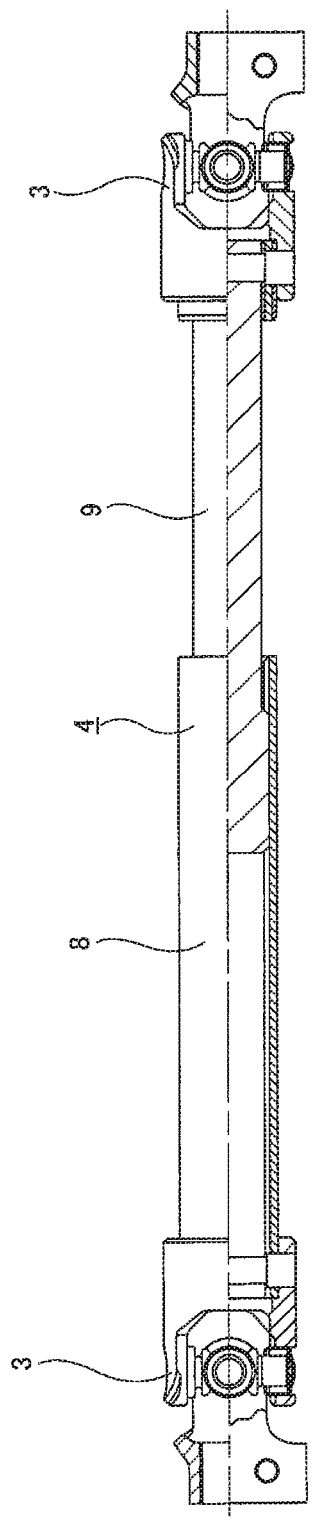
FIG. 13 is a partially cut side view of an intermediate shaft with cross shaft universal joints assembled to the two ends thereof.
Figure 14:
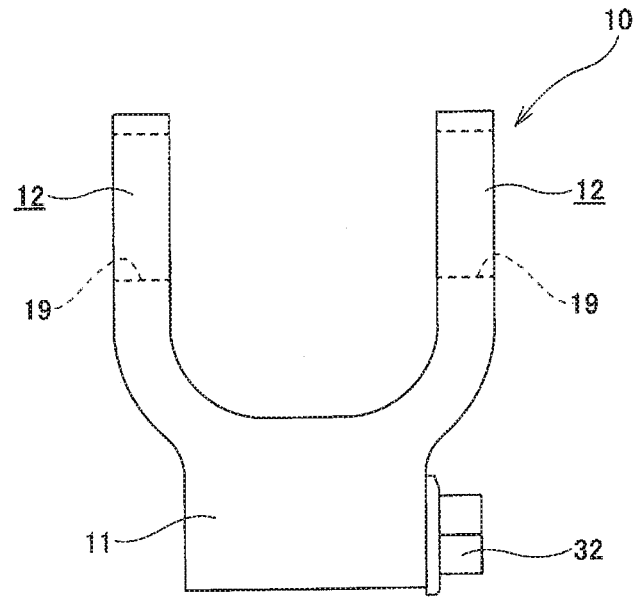
FIG. 14 is a side view of a yoke having a conventional structure.
Figure 15:
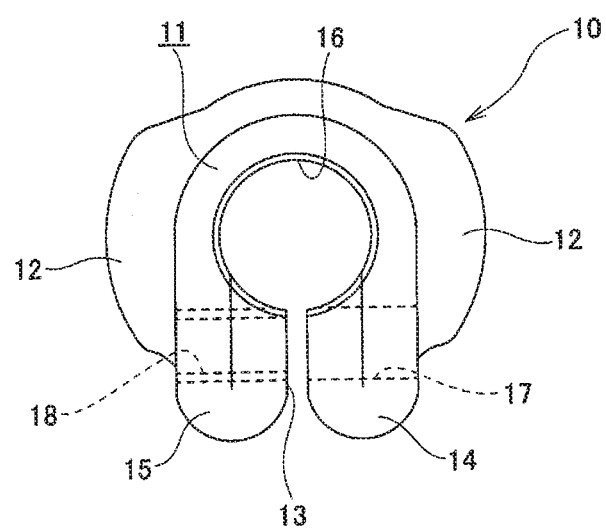
FIG. 15 is an end view of the yoke of FIG. 14 when viewed from below.
Figure 16:
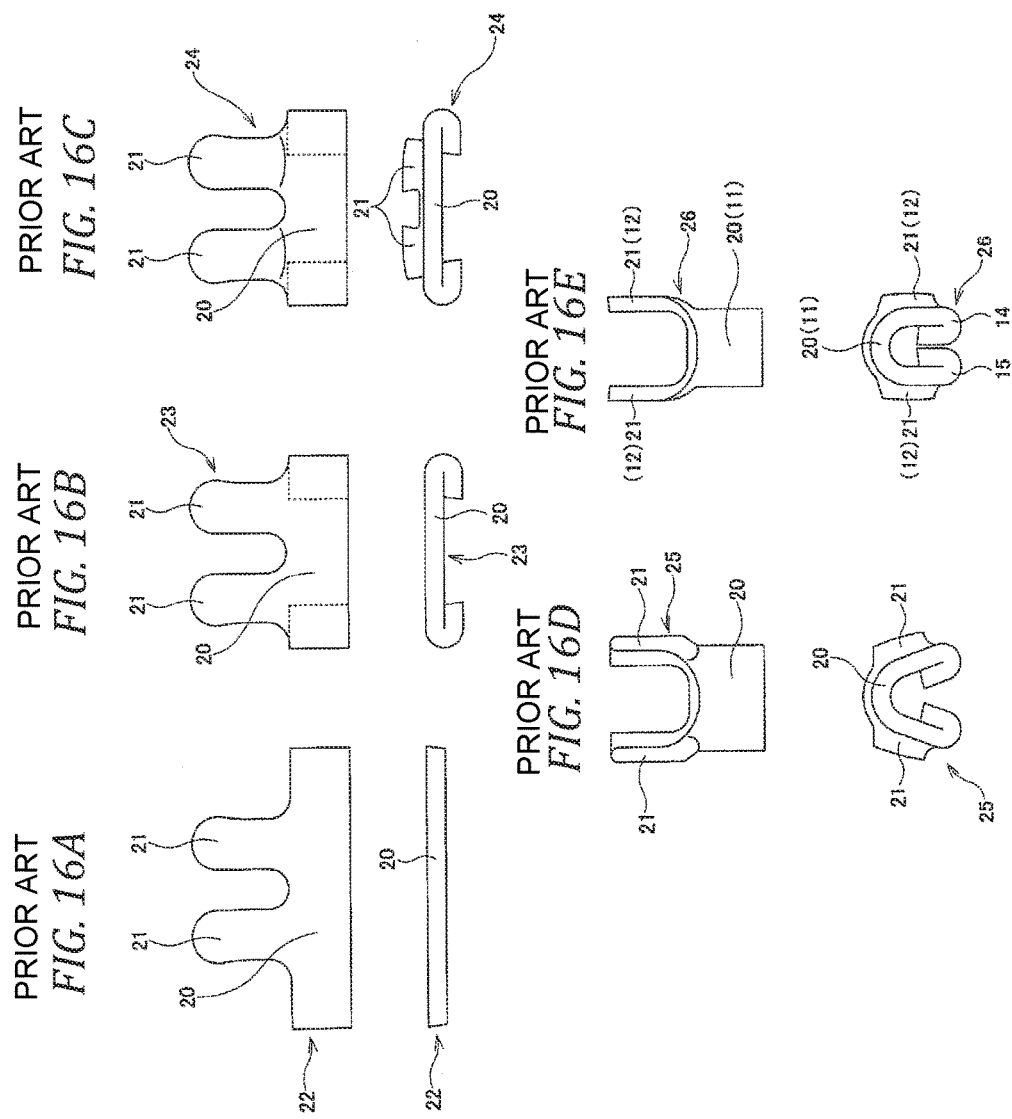
FIGS. 16A to 16E are typical views of a method for manufacturing the yoke of FIG. 14 having the conventional structure, showing the sequence of the steps thereof.
Figure 17:
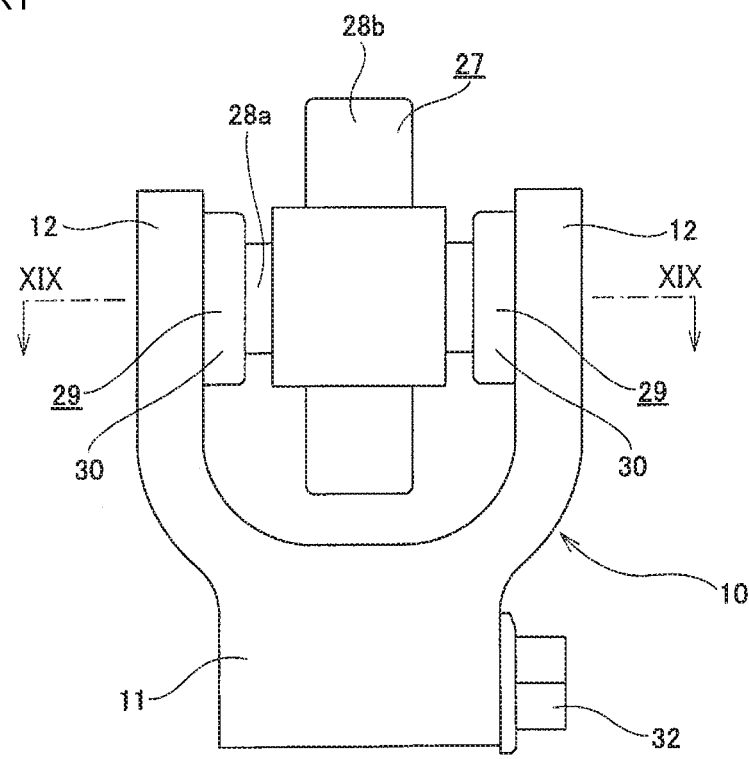
FIG. 17 corresponds to FIG. 14 and shows how a cup bearing incorporated in the yoke supports a cross shaft.
Figure 18:
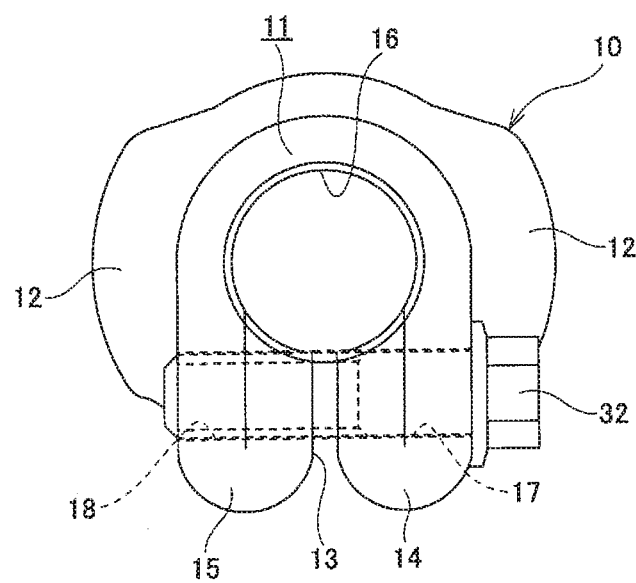
FIG. 18 corresponds to FIG. 15 and shows a state where a bolt is fastened to the yoke.
Figure 19:
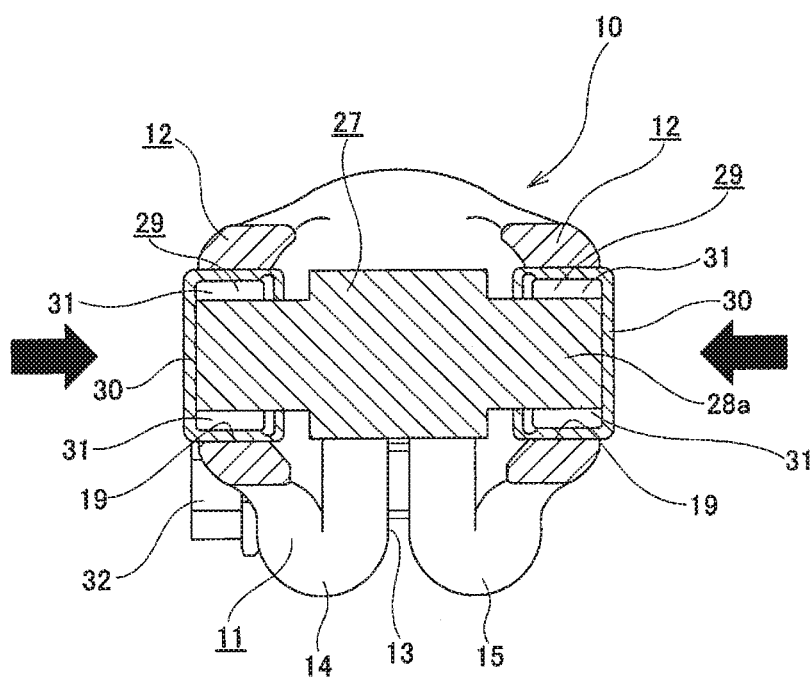
FIG. 19 is a section view of the yoke, taken along the XIX-XIX line of FIG. 17.

For example, like a yoke 10a according to a modification shown in FIG. 11, a discontinuous part 13a sandwiched by first and second flanges 14a and 15a may also be inclined relative to the axial direction of a base part 11a in such a manner that it crosses the axes of the through hole 17b and screw hole 18b at right angles.

Also, in enforcing the invention, the mounting holes respectively formed in the paired flange parts are not limited to the structure that, as in the above respective embodiments, one is formed as a through hole and the other is formed as a screw hole. For example, there can also be employed a structure that the paired mounting holes are respectively formed as through holes and a nut is pressure inserted and fixed to one of the through holes. Also, the thickness dimension of the flange part is not limited to a double thickness dimension of a metal plate used as a material plate. Also, the structures of the above respective embodiments can also be enforced in combination with each other.

Also, the bearing to be incorporated into the circular hole formed in the leading end of the connecting arm part is not limited to a cup bearing (shell type needle bearing), but there may be employed various bearings such as a sliding bearing having a shape with a needle omitted from a cup hearing. Also, the universal joint yoke manufacturing method of the invention is not limited to a method similar to a yoke manufacturing method having a conventional structure, but another step can be added thereto or omitted therefrom; and other various methods can also be employed. Also, the invention is not limited to a press yoke but can also be applied to a forged yoke.

This application is based on the Japanese Patent Application No. 2014-101232 filed on May 15, 2014, Japanese Patent Application No. 2015-090904 filed on Apr. 28, 2015 and Japanese Patent Application No. 2015-090905 filed on Apr. 28, 2015, and thus the contents thereof are incorporated herein for reference.

DESCRIPTION OF REFERENCE NUMERALS AND SIGNS

1: Steering wheel
2: Steering shaft
3: Universal joint

4: Intermediate shaft
5: Steering gear unit
6: Input shaft
7: Tie rod
8: Outer shaft
9: Inner shaft
10, 10a, 10b, 10c, 10d: Yoke
11, 11a, 11b: Base part
12, 12a, 12b, 12c: Connecting arm part
13, 13a: Discontinuous part (slit)
14, 14a, 14b: First flange part
15, 15a, 15b: Second flange part
16: Female serration
17, 17a, 17b: Through hole
18, 18a, 18b: Screw hole
19, 19a, 19b, 19c: Circular hole
20: Base plate part
21: Tongue-like part
22: Material plate
23: First intermediate material
24: Second intermediate material
25: Third intermediate material
26: Fourth intermediate material
27: Cross shaft
28a, 28b: Shaft part
29: Cup bearing
30: Cup
31: Needle
32: Bolt
33: Cylindrical part
34: Bottom part
35: Inward flange part

The invention claimed is:

1. A yoke for a cross shaft universal joint, comprising:
a base part for connecting and fixing the end of a rotation shaft thereto; and
a pair of connecting arm parts respectively extending in the axial direction from two diametrically opposite positions corresponding to the base part at one axial end edge of the base part, wherein:
the pair of connecting arm parts include a pair of circular holes formed at tip portions thereof to be concentric with each other, the pair of circular holes being configured to pivotally support the end of a shaft part, forming a cross shaft, through bearings;
the base part has a partially-lacking cylindrical shape and includes a discontinuous part penetrating in the axial direction therethrough in one circumferential location of the base part, the one circumferential location existing between the paired connecting arm parts and being 90° out of phase with the paired connecting arm parts in the circumferential direction;
the base part includes: a pair of flange parts formed across the discontinuous part; and a pair of mounting holes formed in the mutually matching portions of the pair of flange parts; and
the paired mounting holes are formed such that the respective axes thereof are inclined relative to the axes of the paired circular holes, and mutually approaching forces are applied to the paired connecting arm parts in a direction inclined relative to the axes of the circular holes by putting the paired flange parts nearer to each other up to a dimension capable of fixing the end of the rotation shaft within the base part.

2. The yoke for a cross shaft universal joint according to claim 1, wherein
the axial direction of the axes of the paired mounting holes is inclined relative to the axial direction of the axes of the paired circular holes.

3. The yoke for a cross shaft universal joint according to claim 1, wherein,
when viewed from the axial direction of the rotation shaft, the axial direction of the axes of the paired mounting holes is inclined relative to the axial direction of the axes of the paired circular holes.

4. The yoke for a cross shaft universal joint according to claim 2, wherein
the discontinuous part is inclined relative to the axial direction of the base part in such a manner that it crosses the axes of the paired mounting holes at right angles.

5. The yoke for a cross shaft universal joint according to claim 1, wherein
the mounting hole formed in one of the paired flange parts is a through hole, while the mounting hole formed in the other is a screw hole.

* * * * *